United States Patent [19]

Freeny, Jr.

[11] Patent Number: 4,539,483
[45] Date of Patent: Sep. 3, 1985

[54] SYSTEM FOR UTILIZING EXISTING MOTORS WITH OUTPUT SHAFTS FOR DRIVING BLADES

[75] Inventor: Charles C. Freeny, Jr., Fort Worth, Tex.

[73] Assignee: Power Technology Partners, Ltd., Oklahoma City, Okla.

[21] Appl. No.: 528,141

[22] Filed: Aug. 31, 1983

[51] Int. Cl.³ .............................................. H02K 7/18
[52] U.S. Cl. ................................................... 290/1 R
[58] Field of Search ............. 290/1 R, 1 A, 1 B, 1 C, 290/1 D, 38 R, 45, 46, 48, 50, DIG. 9; 417/229, 236

[56] References Cited

U.S. PATENT DOCUMENTS 3,151,563 10/1964 Lita et al. ............................ 417/236
4,010,377 3/1977 McKenzie .......................... 290/1 R
4,217,537 8/1980 Hamm ............................. 290/1 R X
4,442,661 4/1984 Stuart ............................... 417/236 X Primary Examiner—William M. Shoop
Assistant Examiner—W. E. Duncanson, Jr.
Attorney, Agent, or Firm—Dunlap & Codding

[57] ABSTRACT

The present invention contemplates a system for utilizing existing motors with output shafts for drivingly rotating such as motors comprising a portion of a lawn mower, for example. The system includes a connector having one portion which is removably connectable to the output shaft of the motor and a power unit adapted for delivering power, such as electrical power, compressed air, or pressurized hydraulic fluid, for example, the connector being connectable to the power unit and the motor providing power input to the power unit through the connector for driving the power unit.

14 Claims, 5 Drawing Figures

SYSTEM FOR UTILIZING EXISTING MOTORS WITH OUTPUT SHAFTS FOR DRIVING BLADES

BACKGROUND OF THE INVENTION

1. Field of the Invention

The present invention generally relates to systems for providing power and, more particularly, but not by way of limitation, to a system for utilizing existing motors with output shafts for drivingly rotating blades to drive power units adapted for delivering power, such as electrical power, compressed air, or compressed hydraulic fluid, for example.

DESCRIPTION OF THE PREFERRED EMBODIMENT

Figure 1:
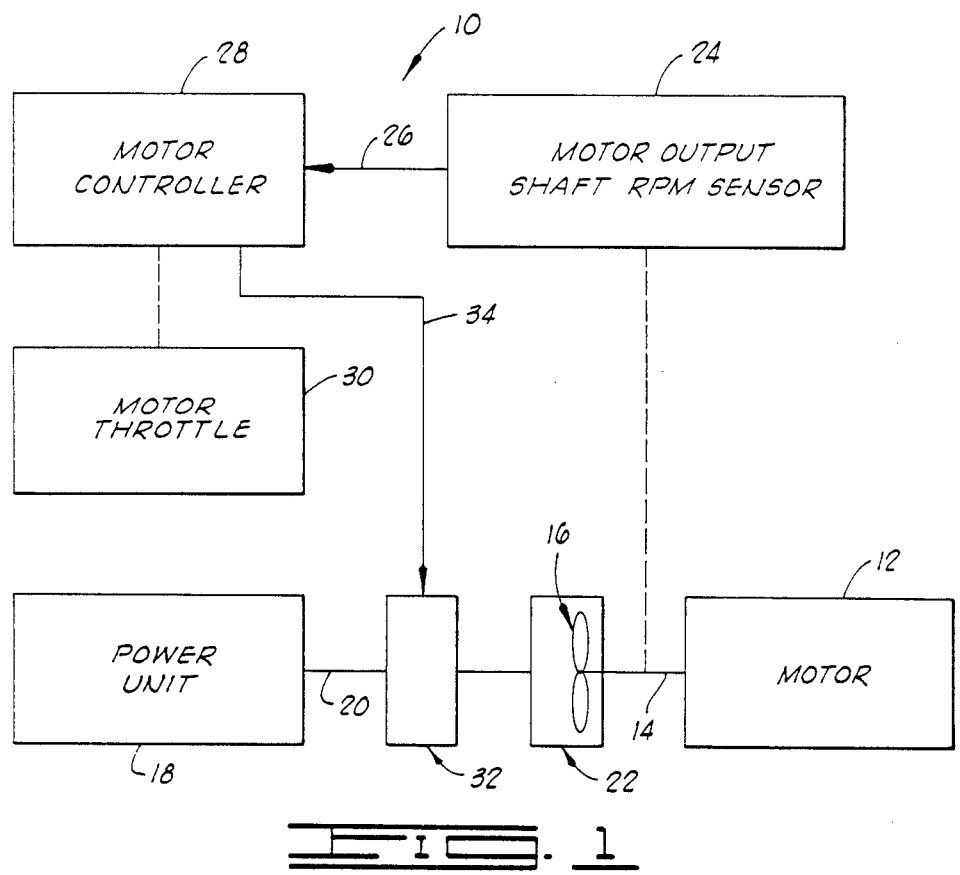
FIG. 1 is a schematic, diagrammatic view of a system which is constructed in accordance with the present invention for utilizing existing motors with output shafts for driving blades for driving power units adapted to deliver power.

Shown in FIG. 1 is a diagrammatic, schematic view of a system 10 which is constructed in accordance with the present invention. The system 10 of the present invention particularly is adapted to utilize existing motors with output shafts for drivingly rotating blades to provide the driving power for power units adapted for delivering power, an existing motor being shown in FIG. 1 and designated therein by the reference numeral 12 with an output shaft 14 for drivingly rotating blades 16 and a power unit being shown in FIG. 1 and designated therein by the reference numeral 18. The power unit 18 is adapted for delivering power and includes an input shaft 20 which is connected to the output shaft 14 of the motor 12 by way of a connector 22. The connector 22 has one portion which is removably connectable to the output shaft 14 of the motor 12 and the connector 16 has one other portion which is connectable to the input shaft 20 of the power unit 18 so the motor 12 is connected to the power unit 18 by way of the connector 22. In operation, the motor 12 provides the power input to the power unit 18 through the connector 16 for driving the power unit 18 to enable the power unit 18 to deliver power.

In many instances, an individual has existing motors with output shafts for drivingly rotating blades, such as the motors associated with lawn mowers which particularly are adapted to drive the lawn mower blades during the normal operation of the lawn mower. In these instances, the lawn mower motor has been utilized by the individual for powering the lawn mower and driving the lawn mower blades and the existing lawn mower motor has not been utilized as a drive source for the other purpose, because such devices were not constructed or adapted to accommodate the utilization of the lawn mower motor for any other purpose. Further, in many instances an individual has a need for a power unit which is adapted to deliver power, such as an electrical generator for generating electrical power at an output shaft thereof when driven by a motor, an air compressor for providing compressed air at an output shaft thereof when driven by a motor, or a hydraulic power generator for providing pressurized hydraulic fluid at a predetermined pressure at an output thereof when driven by a motor, for example. When such a power unit has been required, an individual generally purchased a power unit and a separate drive source to drive the power unit or, in other words, to provide power input to the power unit. The system of the present invention particularly is adapted to provide a means for utilizing existing motors such as the lawn mower motors for driving power units of the type just described without the need of modifying the existing lawn mower and, in one aspect, the system of the present invention also is adapted to maintain the mobility of the lawn mower while simultaneously utilizing the lawn mower to provide power input to the power unit.

The system of the present invention preferably includes a motor output rpm shaft sensor 24 which is connected to the motor 12 output shaft 14 by way of an optical, mechanical, or electrical connection, as indicated by the dashed line connection between the motor output shaft rpm sensor 24 and the motor 12 output shaft 14 in FIG. 1. The connection between the motor 12 output shaft 14 and the motor output shaft rpm sensor 24 provides an input to the motor output shaft rpm sensor 24 which is proportional to the rpm of the motor 12 output shaft 14. The motor output shaft rpm sensor 24 is constructed and adapted to receive the input signal proportional to the rpm of the motor 12 output shaft 14 and to provide an electrical output signal on a signal path 26 which is proportional to the sensed rpm of the motor 12 output shaft 14.

A motor controller 28 is adapted to receive the motor output shaft rpm sensor 24 output signal on the signal path 26. The existing motor 12 includes a motor throttle 30 which is connected to the motor 12 for adjustingly controlling the power delivered to the motor output shaft 14 thereby controlling the rpm of the motor 12 output shaft 14. The motor controller 28 is mechanically connected to the motor throttle 30 and the motor controller 28 particularly is adapted to adjust the motor throttle 30 in response to the received motor output shaft rpm sensor 24 output signal on the signal path 26 for adjustingly maintaining the rpm of the motor 12 output shaft 14 at a relatively constant value.

A clutch 32 is interposed in the power unit 18 input shaft 20, generally between the connector 22 and the power unit 18. The clutch 32 has an engaged condition wherein the power unit 18 is connected to the motor 12 through the connector 16 and the clutch 32 has a disengaged condition wherein the clutch 32 disconnects the power unit 18 from the motor 12. The clutch 32 is adapted to receive a disengage signal (electrical or mechanical) on a signal path 34 and the clutch 32 is adapted to be conditioned in the disengaged condition in response to receiving the disengage signal on the signal path 34.

Preferably, the motor controller 28 also is adapted to provide the disengage signal on the signal path 34 to the clutch 32 in response to the motor controller 28 receiving a motor output shaft rpm sensor 24 output signal on the signal path 26 indicating that the rpm of the output shaft 14 of the motor 12 has below a predetermined minimum rpm value for a predetermined minimum period of time. In this manner, the motor controller 28 cooperates with the clutch 32 for automatically unloading the motor 12 when the rpm of the motor 12 output shaft 14 falls below a predetermined, minimum value for a predetermined minimum period of time.

Figure 2:
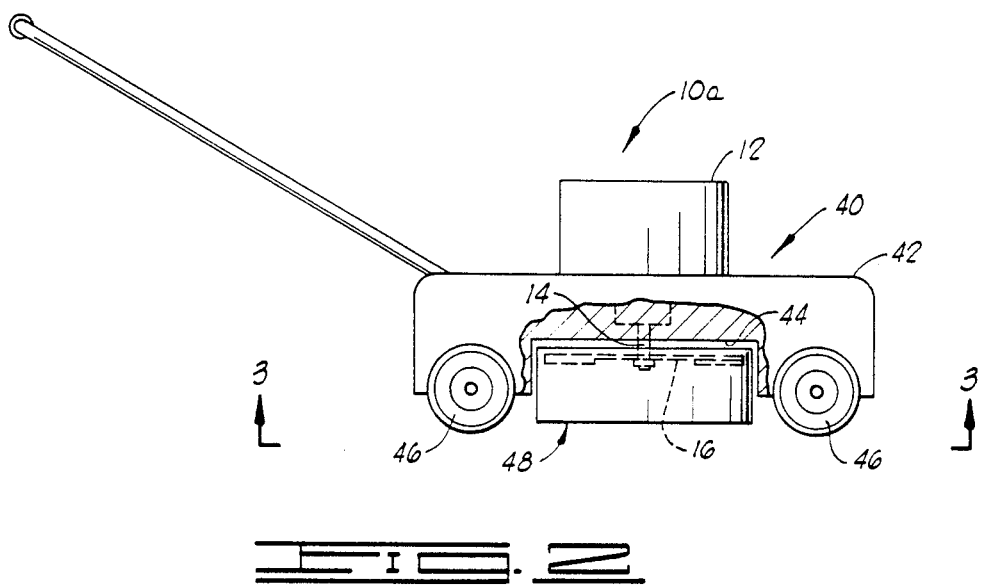
FIG. 2 is a partial side elevational view, partial cut away view of a lawn mower having an output shaft for driving blades with the system of the present invention connected to the lawn mower motor for utilizing the lawn mower motor to drive a power unit for delivering power.
Figure 3:
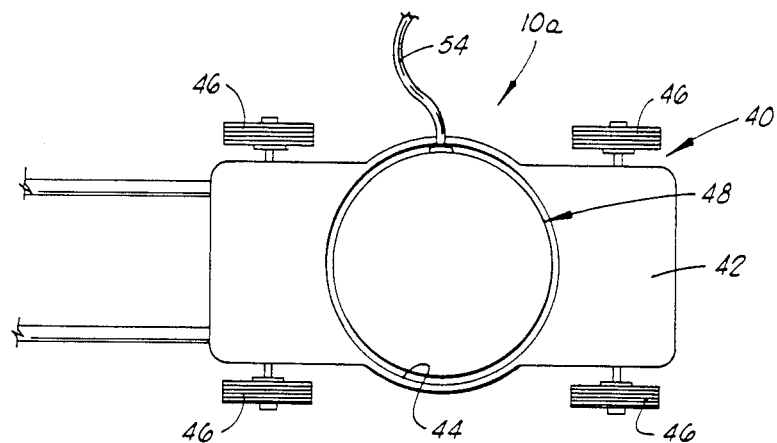
FIG. 3 is a bottom plan view of the lawn mower with the system of the present invention connected thereto of FIG. 2, taken substantially along the lines 3—3 of FIG. 2.

Shown in FIGS. 2 and 3 is a system 10a which is constructed exactly like the system 10 shown in FIG. 1 and described in detail before, except the system 10a particularly is adapted for utilizing existing motors 12 with output shafts 14 for driving blades 16 wherein the motor 12 comprises a portion of a lawn mower 40, the blades 16 in this instance being more particularly lawn mower blades 16. The lawn mower includes a lawn mower housing 42 which is constructed to support the motor 12 and to provide a housing for protectively supporting the lawn mower blades 16. More particularly, the mower housing 42 includes a blade receptacle 44 which is formed in a lower end portion of the mower housing 42 and the blade receptacle 44 is shaped and adapted to receive and protectively house the mower blades 16 in a manner which is well known in the art. Further, the lawn mower 40 is movable supported on a plurality of wheels 46.

Figure 5:
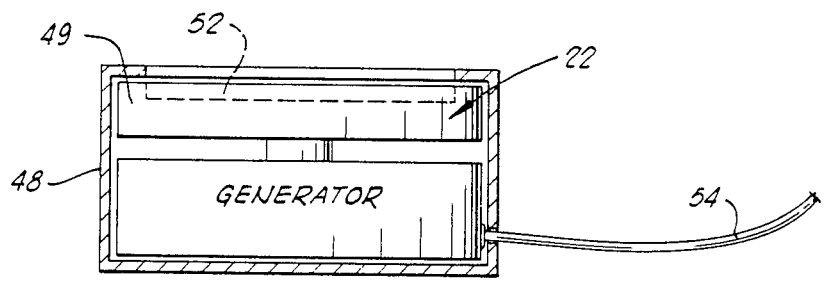
FIG. 5 is a partial sectional, partial diagrammatic view of the connector portion of the system of the present invention showing a generator type of power unit connected to the connector.

As shown in FIGS. 2, 3 and 5, the system 10a includes a power unit housing 48 which is shaped and adapted to supportingly house the power unit 18. In one preferred embodiment, the power unit housing 48 particularly is shaped to be disposed within the blade receptacle 44.

The power unit housing 48 together with the power unit 18 supported therein and the clutch 32 and the connector 22 are shaped and sized to be disposed within the blade receptacle 44 in a position wherein the wheels 46 remain rollingly engagable with the ground so that the lawn mower 40 remains removably supported on the mower wheels 46 with the power unit 18 and the connector 16 disposed in the blade receptacle 44 and the connector 22 connected to the blades 16, thereby maintaining the mobility of the lawn mower 40 while the lawn mower 40 functions to provide the input power to the power unit 18. The clutch 32 is not shown specifically in FIG. 5.

Figure 4:
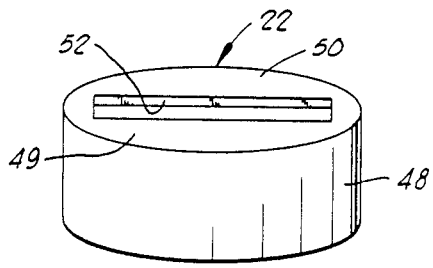
FIG. 4 is a plan view of the connecting surface of the base of the connector portion of the system of the present invention showing the blade depression formed therein for drivingly connecting the lawn mower motor to the power unit.

The connector 22, as shown more clearly in FIG. 4, includes a base 49 having a connecting surface 50 (shown more clearly in FIG. 4). A blade depression 52 is formed in the connecting surface 50 of the connector 22 and the blade depression 52 is shaped and adapted to receive the mower blades 16 on the output shaft 14 of the motor 12. More particularly, the blade depression 52 has a depth which is sufficient to encompass the mower blades 16 so that the mower blades 16 engage the base 49 during the rotation of the mower blades 16, the disposition of the mower blades 16 in the blade depression 52 providing a removable connection between the motor 12 and the connector 22.

Preferably, the connector 16 is connected to the power unit 18 with the clutch 32 interposed in the power unit input shaft 20 between the connector 22 and the power unit 18 and the power unit 18, the clutch 32, and the connector 22 all are generally housed within the power unit housing 48. The power unit housing 48 is then positioned within the blade receptacle 44 in the mower housing 42 to a position wherein the mower blades 16 are engagingly disposed within the blade depression 52 of the connector 22 base 49 thereby removably connecting the motor 12 to the power unit 18 by way of the removable connection provided by the mower blades 16 and the connector 22. After the power unit 18 and the connector 22 have been positioned within the blade receptacle 44, the power unit housing 48 then can be connected to the mower housing 42 by using straps or brackets or other conventional forms of connecting means.

After the power unit 18 and the connectors 22 have been connected to the motor 12 output shaft, the motor output shaft rpm sensor 24 is connected to the motor 12 output shaft 14 and the motor controller 28 is connected to the motor throttle 30. The lawn mower 40 motor 12 then is started to drivingly rotate the motor 12 output shaft 14. The clutch 32 initially is in the engaged condition and thus the motor 12 is connected to the power unit 18 by way of the connector 16 and the clutch 32 so that the power output provided by the motor 12 at the output shaft 14 is drivingly connected to the power unit 18 input shaft 20 by way of the connector 16 to provide power input to the power unit 18. The power input to the power unit 18 provided by the motor 12 provides the power input for the power unit 18 so the power unit 18 functions to deliver power.

As shown in FIGS. 4 and 5, the power unit 18, more particularly, is an electrical generator and in this instance, the power unit 18 provides electrical power by way of an electrical output cord 54 (shown in FIGS. 3 and 5) which then can be utilized for operating other devices (not shown) requiring electrical power input. As noted before, the power unit 18 also could be an air compressor and, in this instance, the power delivered by the power unit 18 would be provided by way of an output hose which is adapted to deliver compressed air provided by the power unit 18 in a driven condition of the power unit 18. Also, the power unit 18 could be a hydraulic power generator and, in this instance, the power provided by the power unit 18 would be by way of a hose connected to the power unit 18 which is adapted for delivering compressed hydraulic fluid at a predetermined pressure in a driven condition of the power unit 18.

During the operation of the systems 10 and 10a, the motor shaft rpm sensor 24 functions to sense the rpms of the motor 12 output shaft 14 and to provide the output signal on the signal path 26 which is proportional to the sensed rpm of the motor 12 output shaft 14. The motor controller receives the motor 12 output shaft rpm sensor 24 output signal on the signal path 26 which is proportional to the rpm of the motor 12 output shaft 14 and, in response to the received signal proportional to the motor 12 output shaft 14 rpms, the motor controller 28 functions to operate the motor throttle 30 to controllingly or adjustingly regulate the power delivered by the motor 12 to the output shaft 14 for controlling the rpm of the motor 12 output shaft 14. In addition, the motor controller 28 also functions to provide the disengage signal on the signal path 34 in response to receiving a signal on the signal path 26 proportional to the rpm of the motor 12 output shaft 14 indicating that the rpm of the motor 12 output shaft 14 is below a predetermined rpm value for a predetermined period of time, the disengage signal on the signal path 34 being received by the clutch 32 and conditioning the clutch 32 in the disengaged position thereby disconnecting the motor 12 from the power unit 18.

Changes may be made in the various elements and assemblies of the system as described herein and in the steps or the sequence of steps of the system described herein without departing from the spirit and scope of the invention as defined in the following claims.

What is claimed:

1. A system for utilizing existing motors with output shafts for drivingly rotating blades, comprising:
   a connector having one portion removably connectable to the output shaft of the motor comprising:
   a base having a connecting surface and a blade depression being formed in the connecting surface, the blade depression being shaped and adapted to receive the blades on the output shaft of the motor and the disposition of the blades in the blade depression providing the removable connection between the motor and connector; and
   a power unit adapted for delivering power having an input shaft, the connector having a portion connectable to the power unit, the motor providing power input to the power unit through the connector, thereby driving the power unit.

2. The system of claim 1 wherein the power unit is one selected from a group consisting of: an electrical generator for generating electrical power at an output thereof when driven by the motor, an air compressor for providing compressed air at an output thereof when driven by the motor, or a hydraulic power generator for providing hydraulic fluid at a predetermined pressure at an output thereof when driven by the motor.

3. The system of claim 1 wherein the motor is defined further as being a portion of a lawn mower.

4. The system of claim 1 wherein the blade depression in the base of the connector is defined further as providing walls in the base and as having a sufficient depth so the blades engage the walls for drivingly rotating the connector in a driven position of the blades.

5. The system of claim 1 wherein the motor is defined further as being a portion of a lawn mower.

6. The system of claim 1 wherein the motor is defined further as including a motor throttle for adjustingly controlling the power delivered to the motor output shaft thereby controlling the rpm of the motor output shaft, and wherein the system is defined further to include;
   a motor output shaft rpm sensor for sensing the rpm of the motor output shaft and for providing an output signal proportional to the sensed rpm of the motor output shaft; and
   a motor controller connectable to the motor throttle and adapted for receiving the motor output shaft rpm sensor output signal, the motor controller being adapted to adjust the motor throttle in response to the motor output shaft rpm sensor for controllingly maintaining the rpm of the motor output shaft at a relatively constant value.

7. The system of claim 6 wherein the system is defined further to include:
   a clutch connected to the power unit and the connector having an engaged condition wherein the power unit is connected to the motor through the connector and the clutch and a disengaged condition wherein the clutch disconnects the power unit from the motor, the clutch being conditioned in the disengaged condition in response to receiving a disengaged signal; and wherein the motor controller is defined further as being adapted to provide the disengage signal to the clutch in response to receiving a motor output shaft rpm sensor output signal indicating that the rpm of the output shaft of the motor has been below a predetermined minimum rpm value for a predetermined minimum period of time.

8. The system of claim 1 wherein the motor is defined further as being a portion of a lawn mower including a mower housing with a blade receptacle for housing the blades, and wherein the lawn mower is movably supported on mower wheels, and wherein the system is defined further to include:
   a power unit housing for housing the power unit, the power unit housing with the connector connected to the power unit being disposable within the blade receptacle in the blade housing to a position wherein the lawn mower remains movably supported on the mower wheels with the power unit and the connector disposed in the blade receptacle and the connector connected to the blades.

9. A system for utilizing existing motors with output shaft for drivingly rotating blades, comprising the steps of:
   providing a power unit adapted for delivering power when driven; and
   connecting removably the power unit to the blades so the motor drivingly rotates the blades and the rotation of the blades provides a power input to the power unit thereby driving the power unit.

10. The system of claim 9 wherein the power unit is one selected from a group consisting of: an electrical generator for generating electrical power at an output thereof when driven by the motor, an air compressor for providing compressed air at an output thereof when driven by the motor, or a hydraulic power generator for providing hydraulic fluid at a predetermined pressure at an output thereof when driven by the motor.

11. The system of claim 9 wherein the motor is defined further as being a portion of a lawn mower.

12. The system of claim 9 defined further to include the steps of:
   sensing the rpm of the motor output shaft and providing an output signal proportional to the sensed rpm of the motor output shaft; and
   controlling the motor in response to the sensed rpm of the motor output shaft to maintain the rpm of the motor output shaft at a predetermined rpm value.

13. The system of claim 9 defined further to include the step of:
   disconnecting the motor from the power unit in response to a sensed rpm of the output shaft of the motor below a predetermined rpm value for a predetermined period of time.

14. The system of claim 9 wherein the motor is defined further as being a portion of a lawn mower which is rollingly supported on mower wheels and wherein the step of connecting removably the power unit to the motor output shaft is defined further as connecting removably the power unit to the motor output shaft so the lawn mower remains removably supported on the mower wheels.

* * * * *